United States Patent [19]

Guttag et al.

[11] Patent Number: 4,933,878
[45] Date of Patent: Jun. 12, 1990

[54] GRAPHICS DATA PROCESSING APPARATUS HAVING NON-LINEAR SATURATING OPERATIONS ON MULTIBIT COLOR DATA

[75] Inventors: Karl M. Guttag, Houston; Michael D. Asal, Sugarland, both of Tex.; Mark F. Novak, Ypsilanti, Mich.

[73] Assignee: Texas Instruments Incorporated, Dallas, Tex.

[21] Appl. No.: 401,577

[22] Filed: Aug. 25, 1989

Related U.S. Application Data

[63] Continuation of Ser. No. 217,118, Jul. 7, 1988, abandoned, which is a continuation of Ser. No. 821,667, Jan. 23, 1986, abandoned.

[51] Int. Cl.[5] .................... G09G 1/16; G06F 15/20
[52] U.S. Cl. .................... 364/521; 340/701; 340/703
[58] Field of Search .................... 364/518–522; 340/701, 703, 721, 724, 750, 798, 799, 800; 358/280, 283, 284

[56] References Cited

U.S. PATENT DOCUMENTS

| | | | |
|---|---|---|---|
| 4,475,161 | 10/1984 | Stock | 364/521 |
| 4,484,187 | 11/1984 | Brown et al. | 340/703 |
| 4,490,797 | 12/1984 | Staggo et al. | 364/522 |
| 4,564,915 | 1/1986 | Evans et al. | 364/521 |
| 4,590,463 | 5/1986 | Smollin | 340/703 |
| 4,694,286 | 9/1987 | Bergstedt | 340/703 |
| 4,695,966 | 9/1987 | Takakura et al. | 364/521 |
| 4,721,951 | 1/1988 | Holler | 340/701 |

Primary Examiner—Gary V. Harkcom
Assistant Examiner—H. R. Herndon
Attorney, Agent, or Firm—Lawrence J. Bassuk; Thomas W. DeMond; Melvin Sharp

[57] ABSTRACT

The graphics data processing apparatus which can logically combine the color data for two image arrays on a pixel by pixel basis, according to a nonlinear saturating function. Two examples of such functions are addition with saturation at the maximum value and subtraction with saturation at the minimum value. These functions can be employed to obtain computer graphics effects not feasible using other function, such as simulating spray painting and light mixing.

23 Claims, 11 Drawing Sheets

GRAPHICS DATA PROCESSING APPARATUS HAVING NON-LINEAR SATURATING OPERATIONS ON MULTIBIT COLOR DATA

This application is a continuation, of application Ser. No. 07/217,118, filed 07/07/88, now abandoned, which is a Continuation, of application Ser. No. 06/821,667, filed January 23, 1986 now abandoned.

CROSS REFERENCE TO RELATED APPLICATIONS

The present application is related to U.S. patent application No. 790,299 filed October 22, 1985, entitled "Graphics Data Processing Apparatus Having Pixel to Window Compare Capability" by Karl M. Guttag, Michael D. Asal and Mark F. Novak, U.S. patent application No. 790,293 filed October 22, 1985, entitled "Logic Circuit for a Pixel to Window Compare Capability" by Richard Simpson and Dyson Wilkes, U.S. patent application No. 795,158 filed November 5, 1985, entitled "Graphics Data Processing Apparatus for Graphic Image Operations upon Data of Independently Selectable Pitch" by Karl M. Guttag, Michael D. Asal and Mark F. Novak, U.S. patent application No. 795,380 filed November 6, 1985, entitled "Linked Cell Discharge Detector Having Improved Response Time" by Mohammed N. Maan, U.S. patent application No. 795,383 filed November 6, 1985, entitled "Graphics Processing Apparatus Having Color Expand Operation for Drawing Color Graphics from Monochrome Data" by Karl M. Guttag, Michael D. Asal and Mark F. Novak, U.S. patent application No. 795,382 filed November 6, 1985, entitled "Graphics Data Processing Apparatus Having Image Operations with Transparent Color Having a Selectable Number of Bits" by Karl M. Guttag, Michael D. Asal and Thomas Preston, U.S. patent application No. 804,204 filed December 3, 1985, entitled "Graphics Processing Apparatus Having Instruction which Operates Separately on X and Y Coordinate of Pixel Location Registers" by Karl M. Guttag, Michael D. Asal, Neil Tebbutt and Mark F. Novak, U.S. patent application No. 804,203 filed December 3, 1985, entitled "Graphics Data Processing Apparatus with Draw and Advance Operation" by Karl M. Guttag, Michael D. Asal, Neil Tebbutt, Jerry R. Van Aken and Mark F. Novak, U.S. patent application No. 821,375 filed January 22, 1985, entitled "Data Processing System with Variable Memory Bank Selection" by Andrew Heilveil, U.S. patent application No. 821,641 filed January 23, 1985, entitled "Programmable Data Processing System and Apparatus for Executing both General Purpose Instructions and Special Purpose Graphic Instructions" by Karl M. Guttag, Kevin C. McDonough and Surgio Maggi, U.S. patent application No. 821,634 filed January 23, 1985, entitled "Data Processing Apparatus and System Having Memory Accesses on Selectably Variable Field Sizes" by Michael D. Asal, Karl M. Guttag, Jerry R. Van Aken, Neil Tebbutt and Mark F. Novak, and U.S. patent application No. 821,644 filed January 23, 1985, entitled "Memory Access Controller Having Variable Priority" by Thomas Preston, Michael D. Asal and Karl M. Guttag.

BACKGROUND OF THE INVENTION

The present invention relates to the field of computer graphics. In particular, this invention relates to the field of bit mapped computer graphics in which the computer memory stores data for each individual picture element or pixel of the display at memory locations that correspond to the location of that pixel on the display. The field of bit mapped computer graphics has benefited greatly from the lowered cost per bit of dynamic random access memory (DRAM). The lowered cost per bit of memory enables larger and more complex displays to be formed in the bit mapped mode.

The reduction in the cost per bit of memory and the consequent increase in the capacity of bit mapped computer graphics has led to the need for processing devices which can advantageously use the bit mapped memory in computer graphics applications. In particular, a type of device has arisen which includes the capacity to draw simple figures, such as lines and circles, under the control of the main processor of the computer. In addition, some devices of this type include a limited capacity for bit block transfer (known as BIT-BLT or raster operation) which involves the transfer of image data from one portion of memory to another, together with logical or arithmetic combinations of that data with the data at the destination location within the memory.

These bit-map controllers with hard wired functions for drawings lines and performing other basic graphics operations represent one approach to meeting the demanding performance requirements of bit maps displays. The built-in algorithms for performing some of the most frequently used graphics operations provides a way of improving overall system performance. However, a useful graphics system often requires many functions in addition to those few which are implemented in such a hard wired controller. These additional required functions must be implemented in software by the primary processor of the computer. Typically these hard wired bit-map controllers permit the processor only limited access to the bit-map memory, thereby limiting the degree to which software can augment the fixed set of functional capacities of the hard wired controller. Accordingly, it would be highly useful to be able to provide a more flexible solution to the problem of controlling the contents of the bit mapped memory, either by providing a more powerful graphics controller or by providing better access to this memory by the system processor, or both.

SUMMARY OF THE INVENTION

The object of the present invention is to provide a saturating arithmetic function in a graphics display. In the preferred embodiment of the present invention this is achieved by providing a graphics data processing system which can perform saturating arithmetic functions when combining the data in two pixel arrays in a pixel array move operation. In this process the data in a first array of pixels called the source is combined on a pixel by pixel basis with the data in a second array of pixels called the destination. Prior art suggests the utility of logical combinatons like AND and OR plus the permutations included when inverting either the source or destination data. Prior art also suggests certain arithmetic functions such as addition, subtraction, minimum and maximum. Prior art does not suggest the use or utility of nonlinear saturating arithmetic functions.

In accordance with the present invention the pixels in the source and destination data are combined in a nonlinear saturating function. Two examples of such functions are addition with saturation at the maximum value and subtraction with saturation at the minimum value.

These functions can be employed to obtain computer graphics effects not feasible using other functions. If the numerical value of the pixel code corresponds to light intensity then the use of these saturating arithmetic functions can be employed to correctly simulate the functions of light addition.

As an example of a saturating process consider the overlapping of two spotlights. The overlapping of two spotlights generates an area of increased light intensity. However, the light intensity cannot increase without limit but must saturate at a maximum value. The use of addition with saturation could easily simulate this process, but it would be difficult to simulate without this function.

A further example of a natural process exhibiting saturation which could be simulated using such saturating arithmetic function is applied to data representing a single color plane, then addition or subtraction of a small amount of that color via a pixel array move operation would simulate the addition of a small amount of spray paint. This process can be repeated thereby changing the color still more. In the real spray painting process a saturation point is eventually reached in which no additional paint can change the color. The saturating arithmetic functions of the present invention could easily simulate this well known natural process which would be difficult or impossible to simulate otherwise.

BRIEF DESCRIPTION OF THE DRAWINGS

These and other objects of the present invention will be readily understood from the following description, taken in conjunction with the drawings in which.

DETAILED DESCRIPTION OF THE PREFERRED EMBODIMENT

Figure 1:
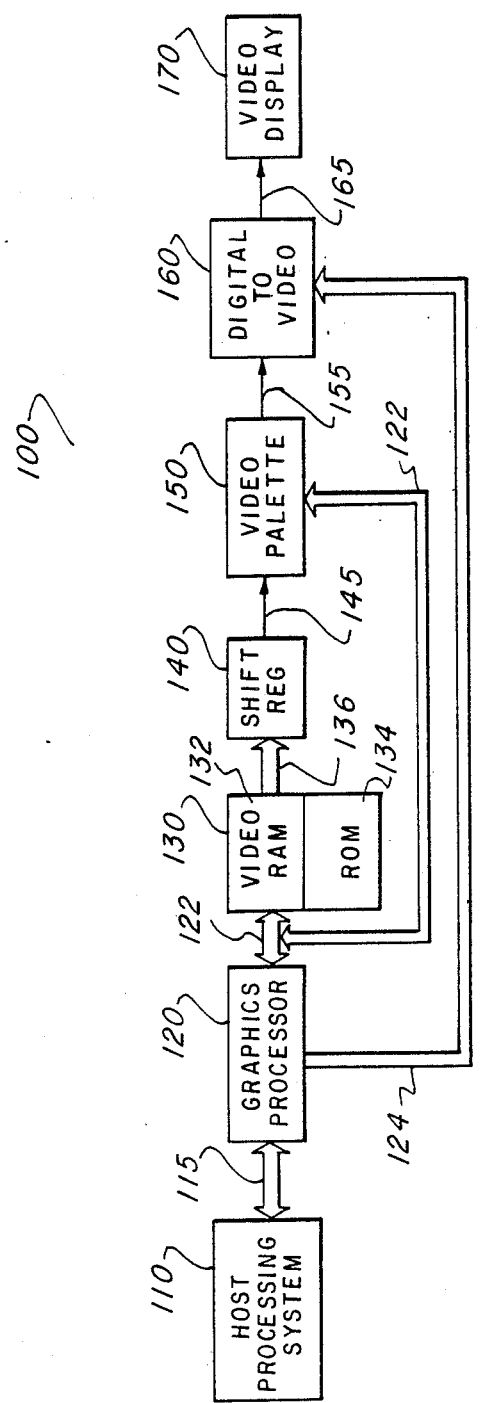
FIG. 1 illustrates a block diagram of a computer with graphics capability constructed in accordance with the principles of the present invention.

FIG. 1 illustrates a block diagram of graphics computer system 100 which is constructed in accordance with the principles of the present invention. Graphics computer system 100 includes host processing system 110, graphics processor 120, memory 130, shift register 140, video palette 150, digital to video converter 160 and video display 170.

Host processing system 110 provides the major computational capacity for the graphics computer system 100. Host processing system 110 preferably includes at least one microprocessor, read only memory, random access memory and assorted peripheral devices for forming a complete computer system. Host processing system 110 preferably also includes some form of input device, such as a keyboard or a mouse, and some form of long term storage device such as a disk drive. The details of the construction of host processing system 110 are conventional in nature and known in the art, therefore the present application will not further detail this element. The essential feature of host processing system 110, as far as the present invention is concerned, is that host processing system 110 determines the content of the visual display to be presented to the user.

Graphics processor 120 provides the major data manipulation in accordance with the present invention to generate the particular video display presented to the user. Graphics processor 120 is bidirectionally coupled to host processing system 110 via host bus 115. In accordance with the present invention, graphics processor 120 operates as an independent data processor from host processing system 110, however, it is expected that graphics processor 120 is responsive to requests from host processing system 110 via host bus 115. Graphics processor 120 further communicates with memory 130, and video palette 150 via video memory bus 122. Graphics processor 120 controls the data stored within video RAM 132 via video memory bus 122. In addition, graphics processor 120 may be controlled by programs stored in either video RAM 132 or read only memory 134. Read only memory 134 may additionally include various types of graphic image data, such as alphanumeric characters in one or more font styles and frequently used icons. In addition, graphics processor 122 controls the data stored within video palette 150. This feature will be further disclosed below. Lastly, graphics processor 120 controls digital to video converter 160 via video control bus 124. Graphics processor 120 may control the line length and the number of lines per frame of the video image presented to the user by control of digital to video converter 160 via video control bus 124.

Video memory 130 includes video RAM 132 which is bidirectionally coupled to graphics processor 120 via video memory bus 122 and read only memory 134. As previously stated, video RAM 132 includes the bit mapped graphics data which controls the video image presented to the user. This video data may be manipulated by graphics processor 120 via video memory bus 122. In addition, the video data corresponding to the current display screen is output from video RAM 132 via video output bus 136. The data from video output bus 136 corresponds to the picture element to be presented to the user. In the preferred embodiment video RAM 132 is formed of a plurality of TMS4161 64K dynamic random access integrated circuits available from Texas Instruments Corporation, the assignee of the present application. The TMS4161 integrated circuit includes dual ports, enabling display refresh and display update to occur without interference.

Shift register 140 receives the video data from video RAM 130 and assembles it into a display bit stream. In accordance with the typical arrangement of video random access memory 132, this memory consists of a bank of several separate random access memory integrated circuits. The output of each of these integrated circuits is typically only a single bit wide. Therefore, it is necessary to assemble data from a plurality of these circuits in order to obtain a sufficiently high data output rate to specify the image to be presented to the user. Shift register 140 is loaded in parallel from video output bus 136. This data is output in series on line 145. Thus shift register 140 assembles a display bit stream which provides video data at a rate high enough to specify the individual dots within the raster scanned video display.

Video palette 150 receives the high speed video data from shift register 140 via bus 145. Video palette 150 also receives data from graphics processor 120 via video memory bus 122. Video palette 150 converts the data received on bus 145 into a video level output on bus 155. This conversion is achieved by means of a lookup table which is specified by graphics processor 120 via video memory bus 122. The output of video palette 150 may comprise color hue and saturation for each picture element or may comprise red, green and blue primary color levels for each pixel. The table of conversion from the code stored within video memory 132 and the digital levels output via bus 155 is controlled from graphics processor 120 via video memory bus 122.

Digital to video converter 160 receives the digital video information from video palette 150 via bus 155. Digital to video converter 160 is controlled by graphics processor 120 via video control bus 124. Digital to video converter 160 serves to convert the digital output of video palette 150 into the desired analog levels for application to video display 170 via video output 165. Digital to video converter 160 is controlled for a specification of the number of pixels per horizontal line and the number of lines per frame, for example, by graphics processor 120 via video controller bus 124. Data within graphics processor 120 controls the generation of the synchronization and blanking signals and the retrace signals by digital to video converter 160. These portions of the video signal are not specified by the data stored within video memory 132, but rather form the control signals necessary for specification of the desired video output.

Lastly, video display 170 receives the video output from digital to video converter 160 via video output line 165. Video display 170 generates the specified video image for viewing by the operator of graphics computer system 100. It should be noted that video palette 150, digital to video converter 160 and video display 170 may operate in accordance to two major video techniques. In the first, the video data is specified in terms of color hue and saturation for each individual pixel. In the other technique, the individual primary color levels of red, blue and green are specified for each individual pixel. Upon determination of the design choice of which of these major techniques to be employed, video palette 150, digital to converter 160 and video display 170 must be constructed to be compatible to this technique. However, the principles of the present invention in regard to the operation of graphics processor 120 are unchanged regardless of the particular design choice of video technique.

Figure 2:
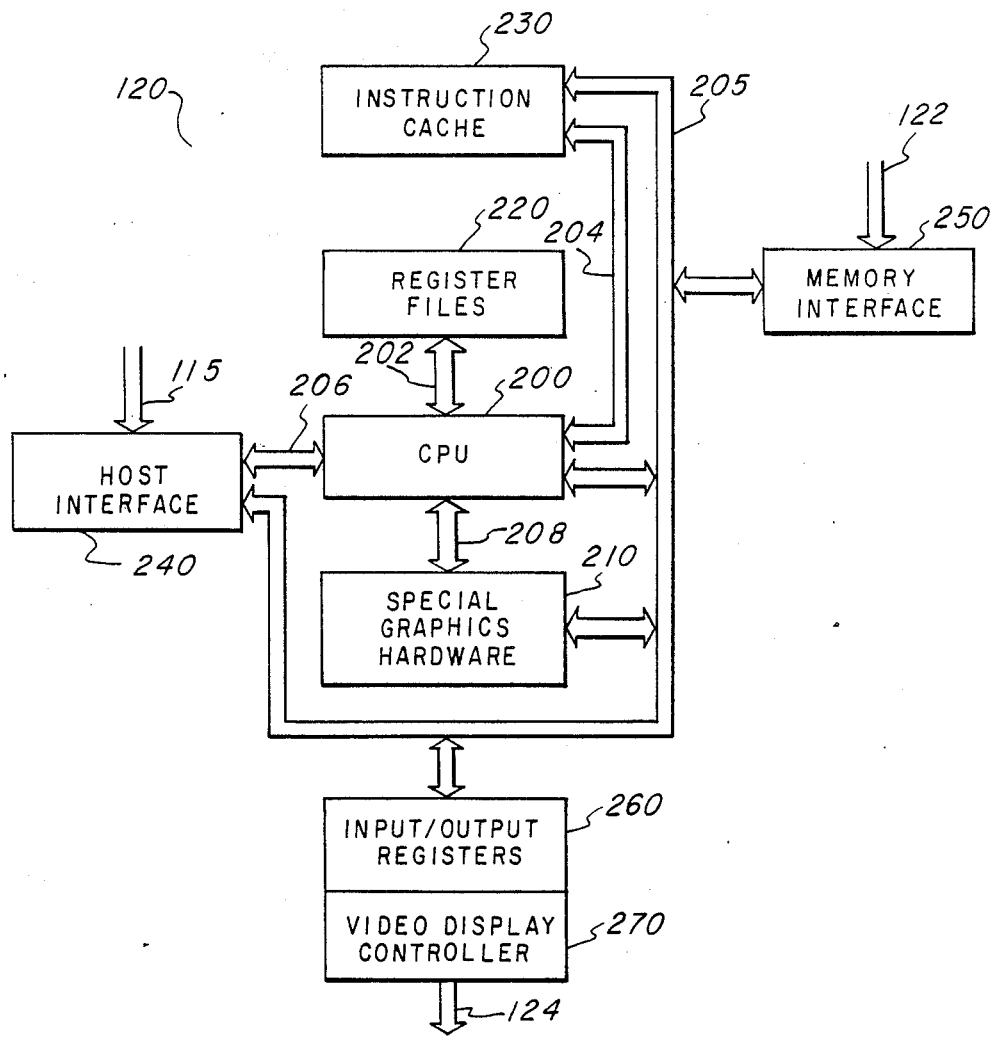
FIG. 2 illustrates the block diagram of a preferred embodiment of the graphics processing circuit of the present invention.

FIG. 2 illustrates graphics processor 120 in further detail. Graphics processor 120 includes central processing unit 200, special graphics hardware 210, register files 220, instruction cache 230, host interface 240, memory interface 250, input/output registers 260 and video display controller 270.

The heart of graphics processor 120 is central processing unit 200. Central processing unit 200 includes the capacity to do general purpose data processing including a number of arithmetic and logic operations normally included in a general purpose central processing unit. In addition, central processing unit 200 controls a number of special purpose graphics instructions, either alone or in conjunction with special graphics hardware 210.

Graphics processor 120 includes a major bus 205 which is connected to most parts of graphics processor 120 including the central processing unit 200. Central processing unit 200 is bidirectionally coupled to a set of register files, including a number of data registers, via bidirectional register bus 202. Register files 220 serve as the depository of the immediately accessible data used by central processing unit 200. As will be further detailed below, register files 220 includes in addition to general purpose registers which may be employed by central processing unit 200, a number of data registers which are employed to store implied operands for graphics instructions.

Central processing unit 200 is connected to instruction cache 230 via instruction cache bus 204. Instruction cache 230 is further coupled to general bus 205 and may be loaded with instruction words from the video memory 130 via video memory bus 122 and memory interface 250. The purpose of instruction cache 230 is to speed up the execution of certain functions of central processing unit 200. A repetitive function or function that is used often within a particular portion of the program executed by central processing unit 200 may be stored within instruction cache 230. Access to instruction cache 230 via instruction cache bus 204 is much faster than access to video memory 130. Thus, the program executed by central processing unit 200 may be speeded up by preliminarily loading the repeated or often used sequences of instructions within instruction cache 230. Then these instructions may be executed more rapidly because they may be fetched more rapidly. Instruction cache 230 need not always contain the same sets of instructions, but may be loaded with a particular set of instructions which will be often used within a particular portion of the program executed by central processing unit 200.

Host interface 240 is coupled to central processing unit 200 via host interface bus 206. Host interface 240 is further connected to the host processing system 110 via host system bus 115. Host interface 240 serves to control the communication between the host processing system 110 and the graphics processor 120. Host interface 240 controls the timing of data transfer between host processing system 110 and graphics processor 120. In this regard, host interface 240 enables either host processing system 110 to interrupt graphics processor 120 or vice versa enabling graphics processor 120 to interrupt host processing system 110. In addition, host interface 240 is coupled to the major bus 205 enabling the host processing system 110 to control directly the data stored within memory 130. Typically host interface 240 would communicate graphics requests from host processing system 110 to graphics processor 120, enabling the host system to specify the type of display to be generated by video display 170 and causing graphics processor 120 to perform a desired graphic function.

Central processing unit 200 is coupled to special graphics hardware 210 via graphics hardware bus 208. Special graphics hardware 210 is further connected to major bus 205. Special graphics hardware 210 operates in conjunction with central processing unit 200 to perform special graphic processing operations. Central processing unit 200, in addition to its function of providing general purpose data processing, controls the application of the special graphics hardware 210 in order to perform special purpose graphics instructions. These special purpose graphics instructions concern the manipulation of data within the bit mapped portion of video RAM 132. Special graphic hardware 210 operates under the control of central processing unit 200 to enable particular advantageous data manipulations regarding the data within video RAM 132.

Memory interface 250 is coupled to major bus 205 and further coupled to video memory bus 122. Memory interface 250 serves to control the communication of data and instructions between graphics processor 120 and memory 130. Memory 130 includes both the bit mapped data to be displayed via video display 170 and instructions and data necessary for the control of the operation of graphics processor 120. These functions include control of the timing of memory access, and control of data and memory multiplexing. In the preferred embodiment, video memory bus 122 includes multiplexed address and data information. Memory interface 250 enables graphics processor 120 to provide the proper output on video memory bus 122 at the appropriate time for access to memory 130.

Graphics processor 120 lastly includes input/output registers 260 and video display controller 270. Input/output registers 260 are bidirectionally coupled to major bus 205 to enable reading and writing within these registers. Input/output registers 260 are preferably within the ordinary memory space of central processing unit 200. Input/output registers 260 include data which specifies the control parameters of video display controller 270. In accordance with the data stored within the input/output registers 260, video display controller 270 generates the signals on video control bus 124 for the desired control of digital to video converter 160. Data within input/output registers 260 includes data for specifying the number of pixels per horizontal line, the horizontal synchronization and blanking intervals, the number of horizontal lines per frame and the vertical synchronization and blanking intervals. Input/output registers 260 may also include data which specifies the type of frame interlace and specifies other types of video control functions. Lastly, input/output registers 260 is a depository for other specific kinds of input and output parameters which will be more fully detailed below.

Graphics processor 120 operates in two differing address modes to address memory 130. These two address modes are X Y addressing and linear addressing. Because the graphics processor 120 operates on both bit mapped graphic data and upon conventional data and instructions, different portions of the memory 130 may be accessed most conveniently via differing addressing modes. Regardless of the particular addressing mode selected, memory interface 250 generates the proper physical address for the appropriate data to be accessed. In linear addressing, the start address of a field is formed of a single multibit linear address. The field size is determined by data within a status register within central processing unit 200. In X Y addressing the start address is a pair of X and Y coordinate values. The field size is equal to the size of a pixel, that is the number of bits required to specify the particular data at a particular pixel.

Figure 3:
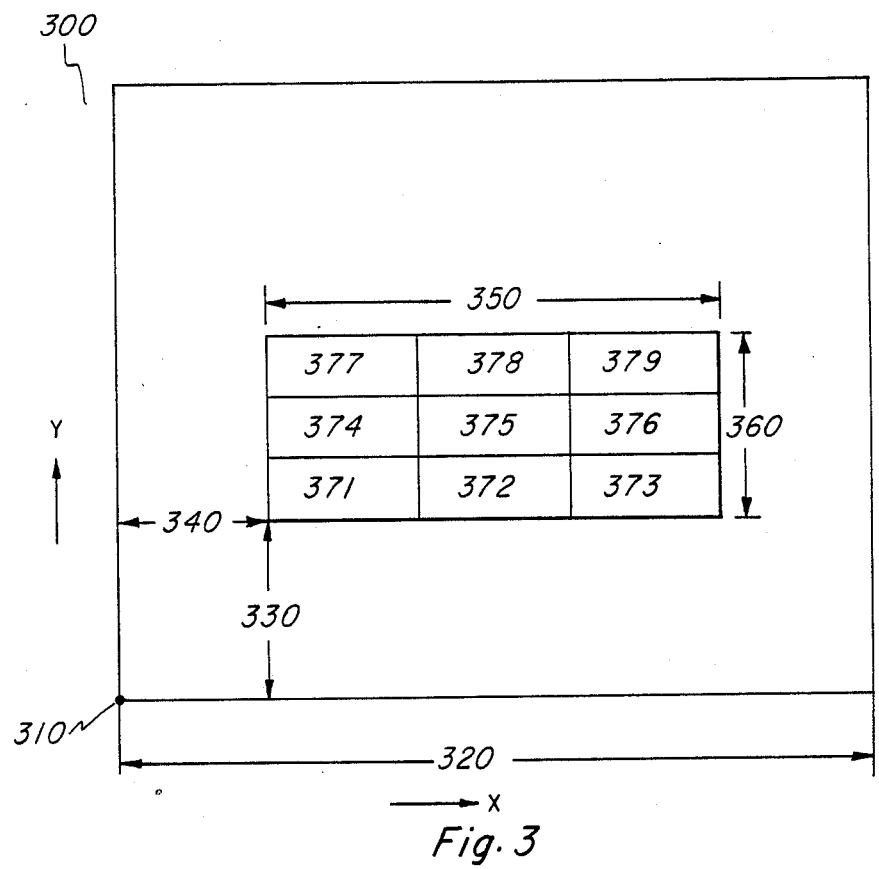
FIG. 3 illustrates the manner of specifying individual pixel addresses within the bit mapped memory in accordance with the X Y addressing technique.
Figure 4:
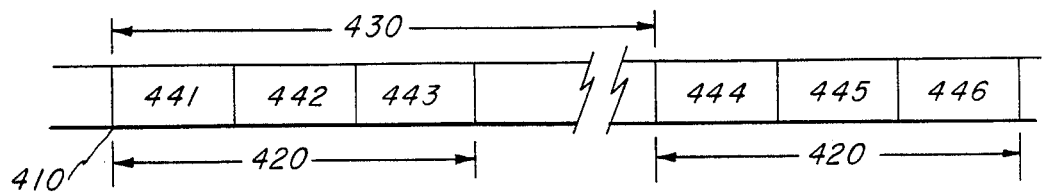
FIG. 4 illustrates a manner of specifying field addresses in accordance with the linear addressing technique.

FIG. 3 illustrates the arrangement of pixel data in accordance with an X Y addressing mode. Similarly, FIG. 4 illustrates the arrangement of similar data in accordance with the linear addressing mode. FIG. 3 shows origin 310 which serves as the reference point of the X Y matrix of pixels. The origin 310 is specified as a X Y start address and need not be the first address location within memory. The location of data corresponding to an array of pixels, such as a particular defined image element is specified in relation to the origin address 310. This includes an X start address 340 and a Y start address 330. Together with the origin, X start address 340 and Y start address 330 indicates the starting address of the first pixel data 371 of the particular image desired. The width of the image in pixels is indicated by a quantity delta X 350. The height of the image in pixels is indicated by a quantity delta Y 360. In the example illustrated in FIG. 3, the image includes nine pixels labeled 371 through 379. The last parameter necessary to specify the physical address for each of these pixels is the screen pitch 340 which indicates the width of the memory in number of bits. Specification of these parameters namely X starting address 340, Y starting address 330, delta X 350, delta Y 360 and screen pitch 320 enable memory interface 250 to provide the specified physical address based upon the specified X Y addressing technique.

FIG. 4 similarly illustrates the organization of memory in the linear format. A set of fields 441 to 446, which may be the same as pixels 371 through 376 illustrated in FIG. 3, is illustrated in FIG. 4. The following parameters are necessary to specify the particular elements in accordance with the linear addressing technique. Firstly, is the start address 410 which is the linear start address of the beginning of the first field 441 of the desired array. A second quantity delta X 420 indicates the length of a particular segment of fields in number of bits. A third quantity delta Y (not illustrated in FIG. 4) indicates the number of such segments within the particular array. Lastly, linear pitch 430 indicates the difference in linear start address between adjacent array segments. As in the case of X Y addressing, specification of these linear addressing parameters enables memory interface 250 to generate the proper physical address specified.

The two addressing modes are useful for differing purposes. The X Y addressing mode is most useful for that portion of video RAM 132 which includes the bit map data, called the screen memory which is the portion of memory which controls the display. The linear addressing mode is most useful for off screen memory such as for instructions and for image data which is not currently displayed. This latter category includes the various standard symbols such as alphanumeric type fonts and icons which are employed by the computer system. It is sometimes desirable to be able to convert an X Y address to a linear address. This conversion takes place in accordance with the following formula:

$$LA = OFF + (Y \times SP) + (X \times PS)$$

Where: LA is the linear address; OFF is the screen offset, the linear address of the origin of the X Y coordinate system; Y is the Y address; SP is the screen pitch in bits; X is the X address; and PS is the pixel size in bits. Regardless of which addressing mode is employed, memory 250 generated the proper physical address for access to memory 130.

Figure 5:
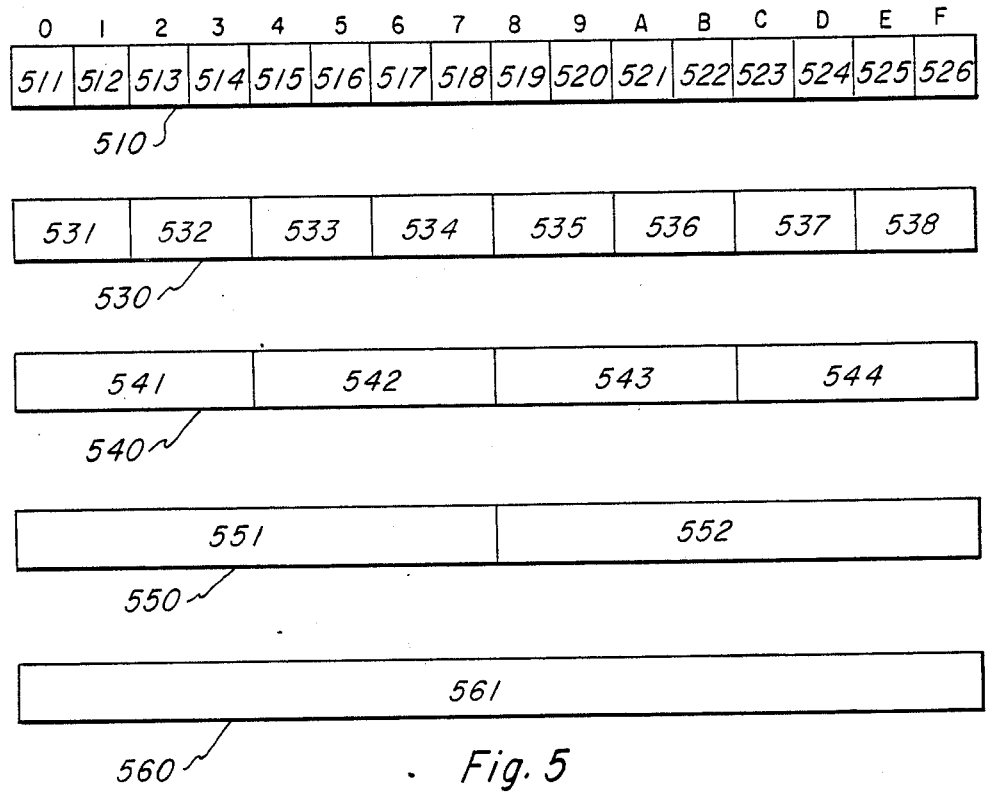
FIG. 5 illustrates the preferred embodiment of storage of pixel data of varying lengths within a single data word in accordance with the preferred embodiment of the present invention.

FIG. 5 illustrates the manner of pixel storage within data words of memory 130. In accordance with the preferred embodiment of the present invention, memory 130 consists of data words of 16 bits each. These 16 bits are illustrated schematically in FIG. 5 by the hexadecimal digits 0 through F. In accordance with the preferred embodiment of the present invention, the number of bits per pixel within memory 130 is an integral power of 2 but no more than 16 bits. As thus limited, each 16 bit word within memory 130 can contain an integral number of such pixels. FIG. 5 illustrates the five available pixel formats corresponding to pixel lengths of 1, 2, 4, 8 and 16 bits. Data word 510 illustrates 16 one bit pixels 511 to 516 thus 16 one bit pixels may be disposed within each 16 bit word. Data word 530 illustrates 8 two bit pixels 531 to 538 which are disposed within the 16 bit data word. Data word 540 illustrates 4 four bit pixels 541 to 544 within the 16 bit data word. Data word 550 illustrates 2 eight bit pixels 551 and 552 within the 16 bit word. Lastly, data word 560 illustrates a single 16 bit pixel 561 stored within the 16 bit data word. By providing pixels in this format, specifically each pixel having an integral power of two number of bits and aligned with the physical word boundaries, pixel manipulation via graphics processor 120 is enhanced. This is because processing each physical word manipulates an integral number of pixels. It is contemplated that within the portion of video RAM 132 which specifies the video display that a horizontal line of pixels is designated by a string of consecutive words such as illustrated in FIG. 5.

Figure 6:
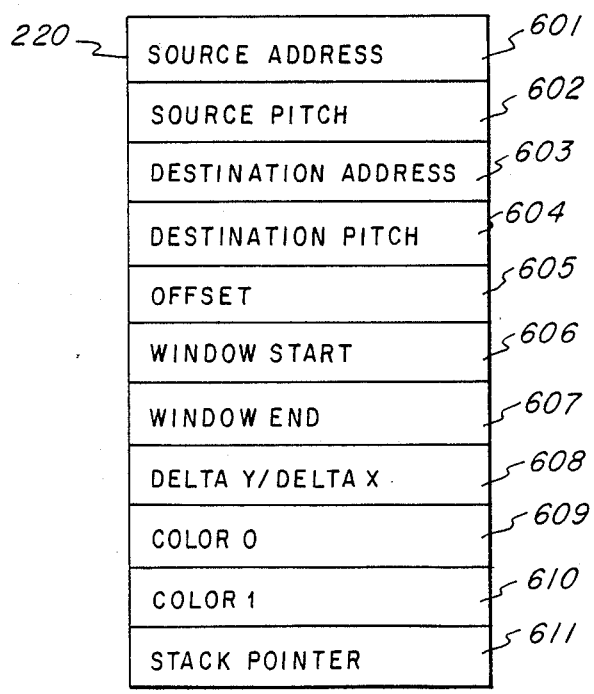
FIG. 6 illustrates the arrangement of contents of implied operands stored within the register memory in accordance with the preferred embodiment of the present invention.

FIG. 6 illustrates the contents of some portions of register files 220 which store implied operands for various graphics instructions. Each of the registers 601 through 611 illustrated in FIG. 6 are within the register address space of central processing unit 200 of graphics processor 120. Note, these register files illustrated in FIG. 6 are not intended to include all the possible registers within register files 220. On the contrary, a typical system will include numerous general purpose undesignated registers which can be employed by central processing unit 200 for a variety of programs specified functions.

Register 601 stores the source address. This is the address of the lower left corner of the source array. This source address is the combination of X address 340 and Y address 330 in the X Y addressing mode or the linear start address 410 in the linear addressing mode.

Register 602 stores the source pitch or the difference in linear start addresses between adjacent rows of the source array. This is either screen pitch 340 illustrated in FIG. 3 or linear pitch 430 illustrated in FIG. 4 depending upon whether the X Y addressing format or the linear addressing format is employed.

Registers 603 and 604 are similar to registers 601 and 602, respectively, except that these registers include the destinations start address and the destination pitch. The destination address stored in register 603 is the address of the lower left hand corner of the destination array in either X Y addressing mode or linear addressing mode. Similarly, the destination pitch stored in register 604 is the difference in linear starting address of adjacent rows, that is either screen pitch 320 or linear pitch 430 dependent upon the addressing mode selected.

Register 605 stores the offset. The offset is the linear bit address corresponding to the origin of the coordinates of the X Y address scheme. As mentioned above, the origin 310 of the X Y address system does not necessarily belong to the physical starting address of the memory. The offset stored in register 605 is the linear start address of the origin 310 of this X Y coordinate system. This offset is employed to convert between linear and X Y addressing.

Registers 606 and 607 store addresses corresponding to a window within the screen memory. The window start stored in register 606 is the X Y address of the lower left hand corner of a display window. Similarly, register 607 stores the window end which is the X Y address of the upper right hand corner of this display window. The addresses within these two registers are employed to determine the boundaries of the specified display window. In accordance with the well known graphics techniques, images within a window within the graphics display may differ from the images of the background. The window start and window end addresses contained in these registers are employed to designate the extent of the window in order to permit graphics processor 120 to determine whether a particular X Y address is inside or outside of the window.

Register 608 stores the delta Y/delta X data. This register is divided into two independent halves, the upper half (higher order bits) designating the height of the source array (delta Y) and the lower half (lower order bits) designating the width of the source array (delta X). The delta Y/delta X data stored in register 608 may be provided in either the X Y addressing format or in the linear addressing format depending upon the manner in which the source array is designated. The meaning of the two quantities delta X and delta Y are discussed above in conjunction with FIGS. 3 and 4.

Registers 609 and 610 each contain pixel data. Color 0 data stored in register 609 contains a pixel value replicated throughout the register corresponding to a first color designated color 0. Similarly, color 1 data stored in register 610 includes a pixel value replicated throughout the register corresponding to a second color value designated color 1. Certain of the graphics instructions of graphics processor 120 employ either or both of these color values within their data manipulation. The use of these registers will be explained further below.

Lastly, the register file 220 includes register 611 which stores the stack pointer address. The stack pointer address stored in register 611 specifies the bit address within video RAM 132 which is the top of the data stack. This value is adjusted as data is pushed onto the data stack or popped from the data stack. This stack pointer address thus serves to indicate the address of the last entered data in the data stack.

Figure 7:
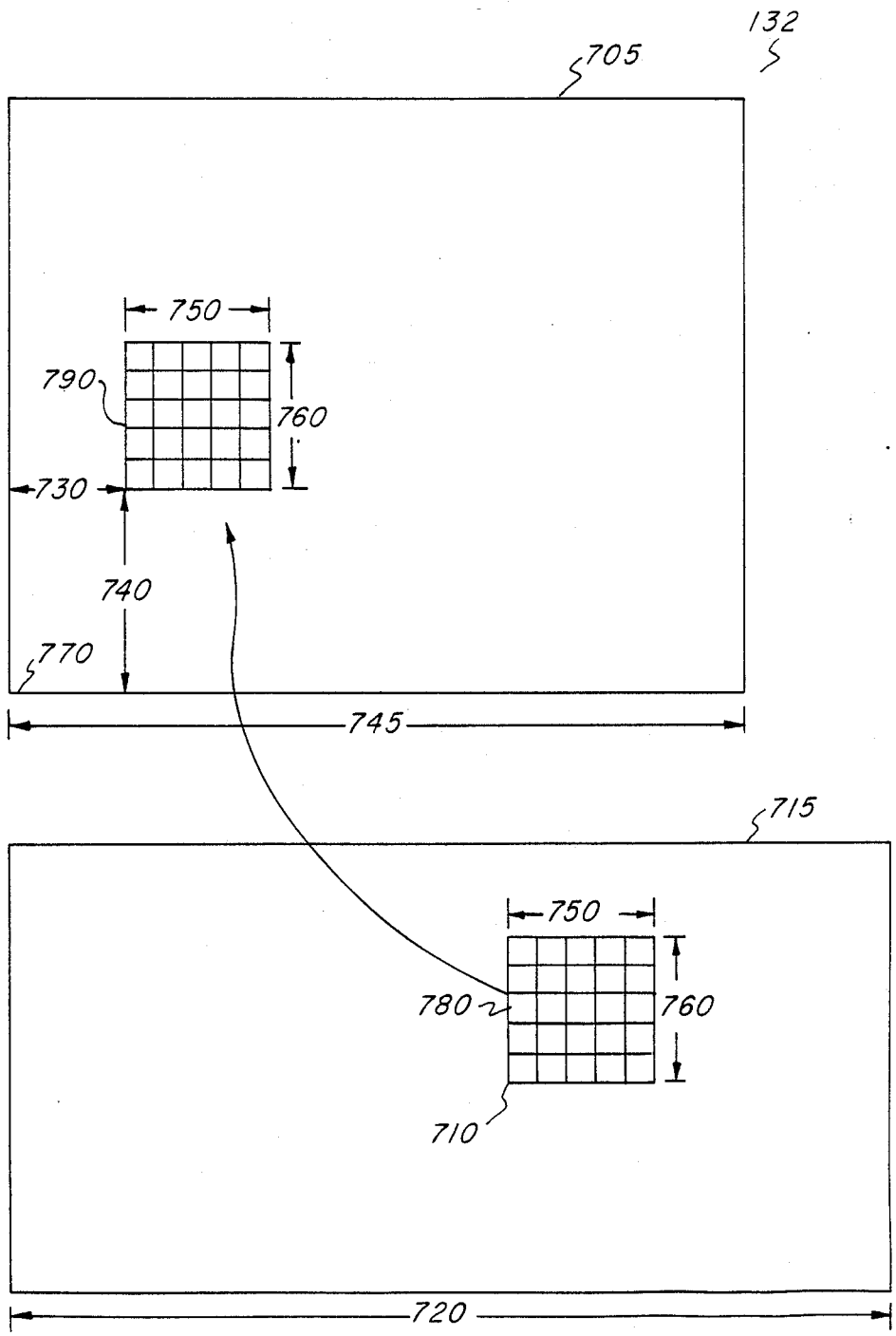
FIG. 7 illustrates the characteristics of an array move operation within the bit mapped memory of the present invention.

FIG. 7 illustrates in schematic form the process of an array move from off screen memory to screen memory. FIG. 7 illustrates video RAM 132 which includes screen memory 705 and off screen memory 715. In FIG. 7 an array of pixels 780 (or more precisely the data corresponding to an array of pixels) is transferred from off screen memory 715 to screen memory 705 becoming an array of pixels 790.

Prior to the performing the array move operation certain data must be stored in the designated resisters of register files 220. Register 601 must be loaded with the beginning address 710 of the source array of pixels. In the example illustrated in FIG. 7 this is designated in linear addressing mode. The source pitch 720 is stored in register 602. Register 603 is loaded with the destination address. In the example illustrated in FIG. 7 this is designated in X Y addressing mode including X address 730 and Y address 740. Register 604 has the destination pitch 745 stored therein. The linear address of the origin of the X Y coordinate system, offset address 770, is stored in register 605. Lastly, delta Y 750 and delta X 760 are stored in separate halves of register 608.

The array move operation illustrated schematically in FIG. 7 is executed in conjunction with the data stored in these registers of register file 220. In accordance with the preferred embodiment the number of bits per pixel is selected so that an integral number of pixels are stored in a single physical data word. By this choice, the graphics processor may transfer the array of pixels 780 to the array of pixels 790 largely by transfer of whole data words. Even with this selection of the number of bits per pixel in relation to the number of bits per physical data word, it is still necessary to deal with partial words at the array boundaries in some cases. However, this design choice serves to minimize the need to access and transfer partial data words.

In accordance with the preferred embodiment of the present invention, the data transfer schematically represented by FIG. 7 is a special case of a number of differing data transformations. The pixel data from the corresponding address locations of the source image and the destination image are combined in a manner designated by the instruction. The combination of data may be a logical function (such as AND or OR) or it may be an arithmetic function (such as addition or subtraction). The new data thus stored in the array of pixels 790 is a function of both the data of the array of pixels 780 and the current data of pixels 790. The data transfer illustrated in FIG. 7 is only a special case of this more general data transformation in which the data finally stored in the destination array does not depend upon the data previously stored there.

Figure 8:
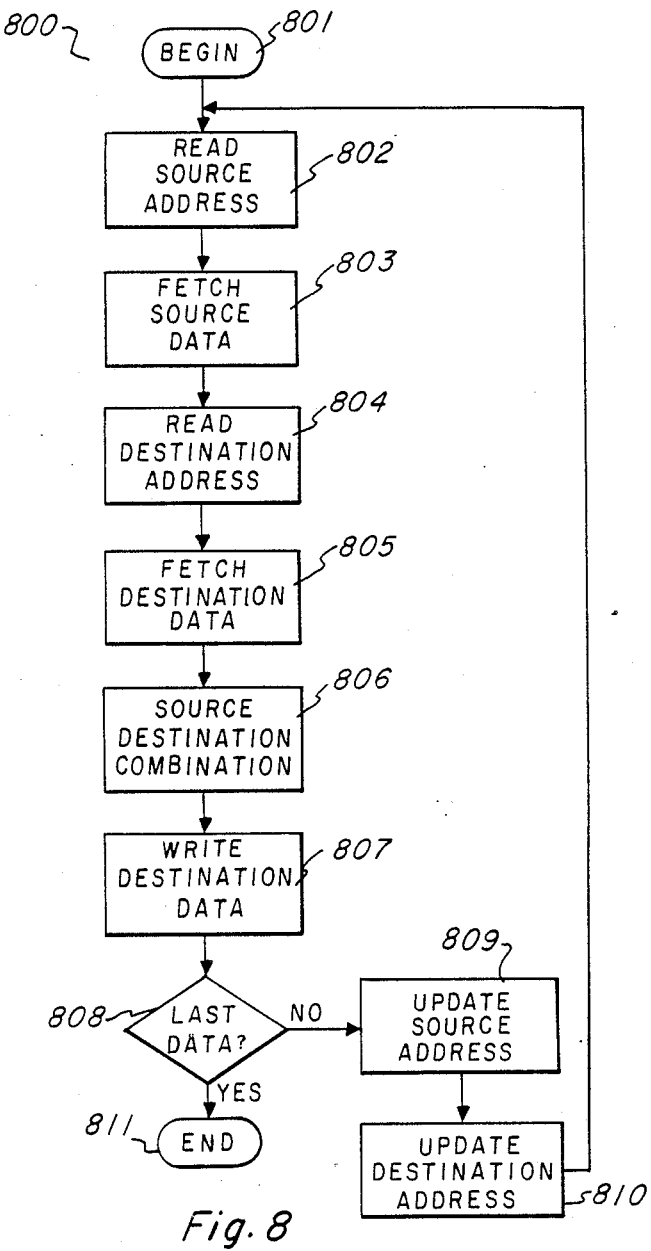
FIG. 8 illustrates a flow chart of a bit block transfer or array move operation in accordance with the present invention.

This process is illustrated by the flow chart in FIG. 8. In accordance with the preferred embodiment the transfer takes place sequentially by physical data words. Once the process begins (start block 801) the data stored in the register 601 is read to obtain the source address (processing block 802). Next graphics processor 120 fetches the indicated physical data word from memory 130 corresponding to the indicated source address (processing block 803). In the case that the source address is specified in the X Y format, this recall of data would include the steps of converting the X Y address into the corresponding physical address. A similar process of recall of the destination address from register 603 (processing block 804) and then fetching of the indicated physical data word (processing block 805) takes place for the data contained at the destination location.

This combined data is then restored in the destination location previously determined (processing block 806). The source and destination pixel data are then combined in accordance with the combination mode designated by the particular data transfer instruction being executed. This is performed on a pixel by pixel basis even if the physical data word includes data corresponding to more than one pixel. This combined data is then written into the specified destination location (processing block 807).

In conjunction with the delta Y/delta X information stored in register 608, graphics processor 120 determines whether or not the entire data transfer has taken place (decision block 808) by detecting whether the last data has been transferred. If the entire data transfer has not been performed, then the source address is updated. In conjunction with the source address previously stored in register 601 and the source pitch data stored in register 602 the source address stored in register 601 is updated to refer to the next data word to be transferred (processing block 809). Similarly, the destination address stored in register 603 is updated in conjunction with the destination pitch data stored in register 604 to refer to the next data word in the destination (processing block 810). This process is repeated using the new source stored in register 601 and the new destination data stored in register 603.

As noted above the delta Y/delta X data stored in register 608 is used to define the limits of the image to be transferred. When the entire image has been transferred as indicated with reference to the delta Y/delta X data stored in register 608 (decision block 808), then the instruction execution is complete (end block 811) and graphics processor 120 continues by executing the next instruction in its program. As noted, in the preferred embodiment this process illustrated in FIG. 8 is implemented in instruction microcode and the entire data transformation process, referred to as an array move, is performed in response to a single instruction to graphics processor 120.

Figure 9:
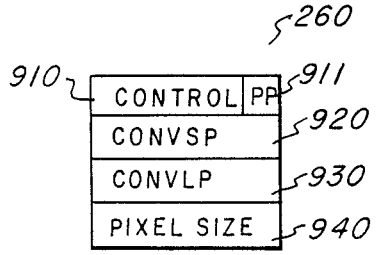
FIG. 9 illustrates the arrangement of contents of implied operands stored within the input/output registers in accordance with the preferred embodiment of the present invention.

FIG. 9 illustrates a portion of input/output registers 260 which is employed to store data relevant to the pixel array move operations of the present invention. Firstly, input/output registers 260 includes a register 910 which stores a control word. This control word is used to specify types of operations performed by central processing unit 210. In particular, pixel processing section 911 within the control word stored in register 910 specifies the type of source destination combination performed during array moves. As noted in regards to FIG. 8 and in particular to processing block 806, this combination of source and pixel data may include various logic and arithmetic functions. The relationship between the state of the pixel processing section 911 and the source destination combination performed during a pixel array move is shown in Table 1.

TABLE 1

| PP | Operation | | | Description |
|---|---|---|---|---|
| | | Logical Combinations | | |
| 00000 | | S | → D | Replace Destination with Source |
| 00001 | D AND | S | → D | AND Source with Destination |
| 00010 | D— AND | S | → D | AND Source with NOT Destination |
| 00011 | | 0 | → D | Replace Destination with zeros |
| 00100 | D XOR | S— | → D | XOR NOT Source with Destination |
| 00101 | D AND | S— | → D | AND NOT Source with Destination |
| 00110 | | D— | → D | Negate Destination |
| 00111 | D NOR | S | → D | NOR Source with Destination |
| 01000 | D OR | S | → D | OR Source with Destination |
| 01001 | | D | → D | No operation |
| 01010 | D XOR | S | → D | XOR Source with Destination |
| 01011 | D AND | 'S— | → D | AND NOT Source with Destination |
| 01100 | | 1 | → D | Replace Destination with ones |
| 01101 | D OR | S— | → D | OR NOT Source with Destination |
| 01110 | D NAND | S | → D | NAND Source with Destination |
| 01111 | | S— | → D | Replace Destination with NOT Source |
| | | Arithmetic Combinations | | |
| 10000 | D + S | | → D | Add Source to Destination |
| 10001 | ADDS(D,S) | | → D | Add S to D with Saturation |
| 10010 | D — S | | → D | Subtract Source from Destination |
| 10011 | SUBS(D,S) | | → D | Subtract S from D with Saturation |
| 10100 | MAX(D,S) | | → D | Maximum of Source and Destination |
| 10101 | MIN(D,S) | | → D | Minimum of Source and Destination |

Registers 920 and 930 are employed to store data which is useful in converting between X Y and linear addresses. CONVSP data stored in register 920 is a precalculated factor employed to enable conversion from X Y addressing to linear addressing for screen pitch. This factor is:

$$16 + \log_2(\text{screen pitch})$$

In a similar fashion, the data CONVLP stored in register 930 is employed for conversion between X Y addressing and linear addressing for the linear pitch. This data corresponds to:

$$16 + \log_2(\text{linear pitch})$$

Storing this data in registers 920 and 930 in this manner enables central processing unit 200 to readily access this data in order to quickly implement the conversions between X Y addressing and linear addressing.

Register 940 has the pixel size data stored therein. The pixel size data indicates the number of bits per pixel within the displayable portion of video RAM 132. As previously noted in conjunction with FIG. 5, the pixel size is constrained by the preferred word size. In the preferred embodiment, graphics processor of the present invention operates on 16 bit data word. The number of bits per is constrained in the preferred embodiment to be an integral factor of 16, the number of bits per word. Thus, the number of bits per pixel could be one, two, four, eight or sixteen. Register 940 stores pixel size data which equals the number of bits per pixel selected. Thus, if a single bit per pixel has been selected, register 940 stores the numerical data 1. Similarly, if two-bit per pixel has been selected, then register 940 stores numerical data equal to 2. Likewise, other possible numbers of bits per pixel are indicated by the numeric values stored within register 940. This pixel size data is employed by central processing unit 200 in executing various instructions, in particular the pixel processing during a pixel array move to be discussed further below.

Figure 10:
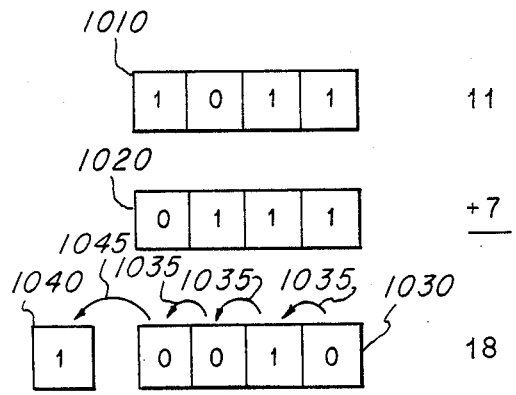
FIG. 10 illustrates schematically an example of an addition operation which generates a saturation signal in accordance with the preferred embodiment of the present invention.
Figure 11:
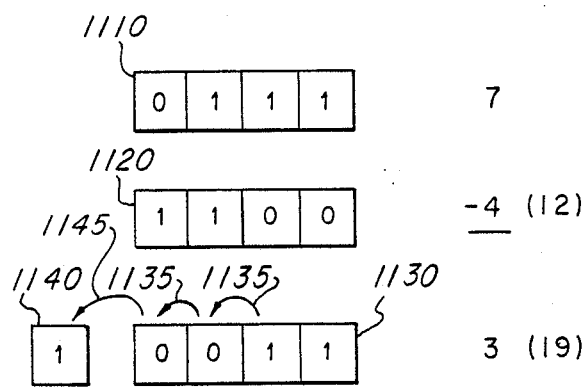
FIG. 11 illustrates schematically an example of a subtraction operation which does not generate a saturation signal in accordance with the preferred embodiment of the present invention.
Figure 12:
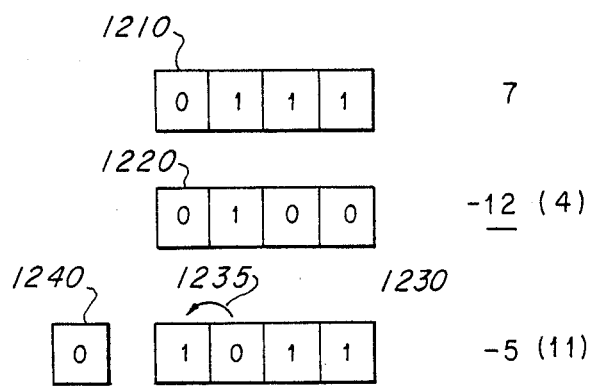
FIG. 12 illustrates schematically an example of a subtraction operation which generates a saturation signal in accordance with the preferred embodiment of the present invention.

The theory behind the manner of operation of the addition with saturation and the subtraction with saturation will be explained below. Pixel processing operations will now be explained in conjunction with FIGS. 10 to 16. FIGS. 10, 11, and 12 illustrates schematically the manner of performing the addition with saturation and subtraction with saturation operations. In particular, these figures illustrates the manner in which a saturation is detected. FIGS. 13 through 16 illustrate in detail the structure used to perform these operations.

FIG. 10 illustrates an example of the addition of two 4 bit numbers illustrating the addition or addition with saturation. A first 4 bit number 1010 is added to a second 4 bit numbers 1020 yielding a resultant 1030 with a carry bit 1040. As illustrated in FIG. 10 the first 4 bit number 1010 equals "1011" or 11. The second 4 bit number 1020 equals "0111" or 7. The sum of these two 4 bit numbers is a 5 bit number "10010". This 5 bit number equals 18, which is the sum of 11 and 7. Note the addition of the two 4 bit numbers 1010 and 1020 requires a plurality of carry operations 1035 within the resultant 1030 which is the 4 least significant bits. Also note that this addition generates a further carry 1045 into the carry bit 1040. The generation of this carry operation 1045 is employed to detect saturation. Note that the maximum number that can be represented by these 4 bits is "1111" or 15. Any time the sum of two numbers 1010 and 1020 is greater than this maximum value, then a carry 1045 is generated into carry bit 1040. Thus the carry bit 1040 indicates unambiguously whether the sum of 1010 and 1020 is greater than the maximum value that can be stored in 1030, thereby indicating saturation during an addition with saturate operation. In particular, if the sum of the 4 bit numbers 1010 and 1020 was not greater than the maximum value capable of being stored in 1030 (15), then carry operation 1045 would not be required and the carry bit 1040 would be 0.

FIG. 11 illustrates the case of subtraction of two 4 bit numbers which does not require saturation because the resultant is above 0. In accordance with the preferred embodiment with the present invention, the subtraction operation takes place as a two's complement addition. The subtractor is converted into a two's complement number by inversion of each of the bits and the addition of "1". This is the equivalent of subtracting the number in question from one more than the maximum value which can be expressed by the number of bits selected. In this case the maximum value which can be expressed in 4 bits is 15. Therefore, the two's complement of 4 is 12 (15+1−4).

FIG. 11 illustrates substraction by two's complement addition. The first operand 1110 is "0111" corresponding to 7. The second operand 1120 is "1100" which equals 12, the two's complement of 4. The sum of the two operands 1110 and 1120 is the 5 bit number composed of carry bit 1140 and resultant 1130. Note again the carry operation 1135 which is contained wholly within the 4 bit number 1130. Also note this addition requires a further carry operation 1145 into the carry bit 1140. The resultant 1130 is "0011", which is equal to 3, the proper answer to the subtraction. The carry operation 1145 indicates that this resultant is above 0. In this case, no saturation is required because the result is greater than 0. In this regard the carry operation 1145 gives the opposite indication from that of FIG. 10 above. The existence of a carry operation in subtraction by two's complement addition indicates that the resultant is above 0. Therefore, no saturate operation is required in this case.

FIG. 12 illustrates the case of substraction by two's complement addition in which the resultant is less than 0. The first operand 1210 is "0111" which again is 7. In this case the second operand is "0100" which is 4, the two's complement of the number 12. The resultant is a 5 bit number including carry bit 1240 and resultant 1230. Again, note the carry operation 1235 which is wholly within the 4 bits of resultant 1230. Also note that no carry operation into carry bit 1240 is generated in this addition. Therefore, the carry bit 1240 remains 0. In this case the lack of a carry operation, indicated by a 0 for the carry bit 1240, unambiguously indicates that the resultant is less than 0 and that saturation is required. In this case, the resultant 1230 is "1011" which is 11, the two's complement of −5, the proper resultant of this problem.

The simple examples of FIGS. 10, 11 and 12 indicate the theory of operation of the present invention. In the case of addition with saturation, the generation of a carry operation indicates that substitution of a saturated value for the actual data obtained is required. This is because, the generation of a carry in this addition indicates that the resultant is greater than the maximum that can be represented by the number of bits selected. On the contrary, in the case of substraction by two's complement addition, the generation of a carry indicates that the resultant is above 0, and therefore no substitution of data is required. If no carry is generated during subtraction by two's complement addition, then the resultant is less than 0 and subtraction of the saturated value for the resultant data is required.

Figure 13:
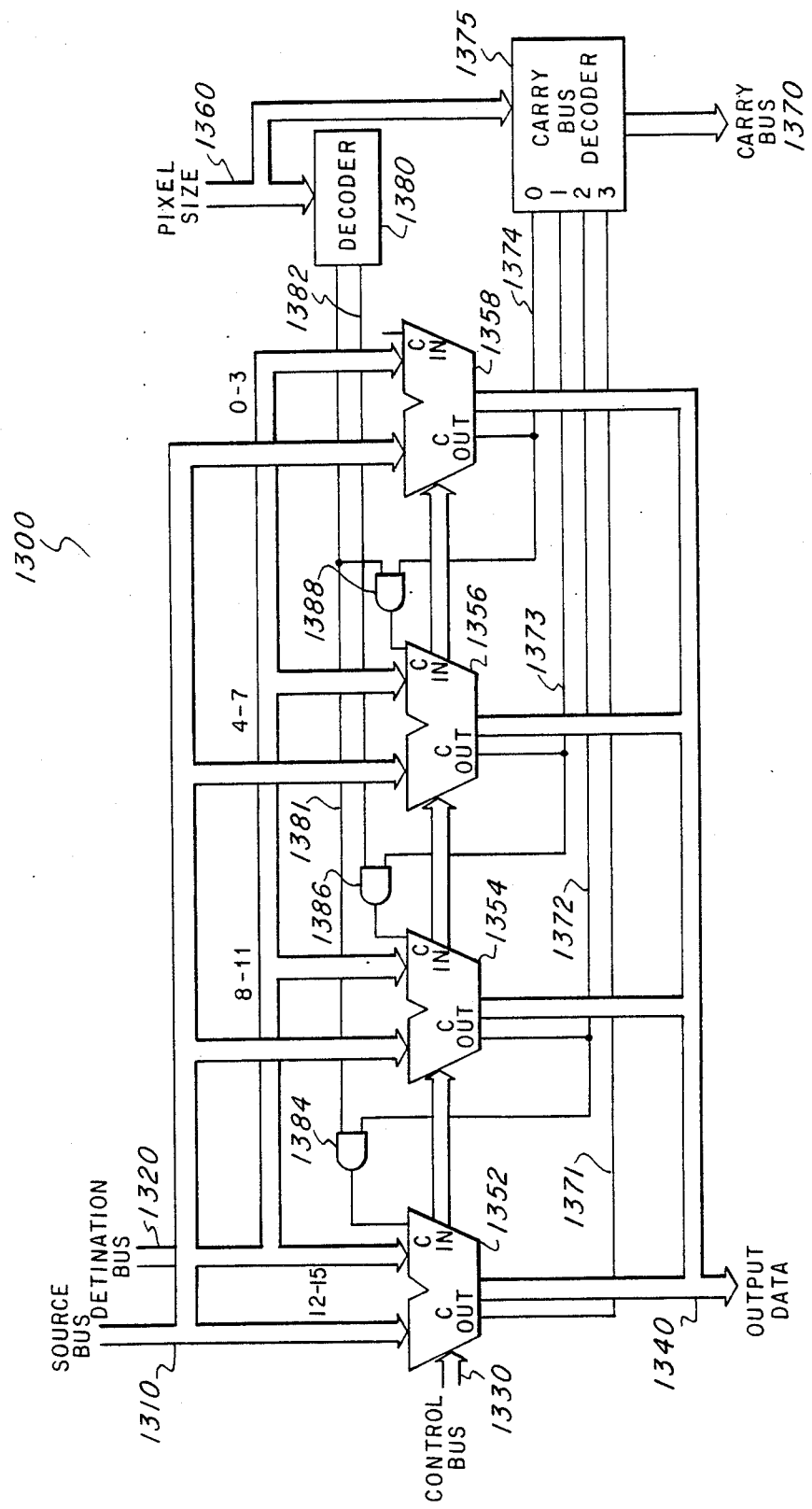
Figure 14:
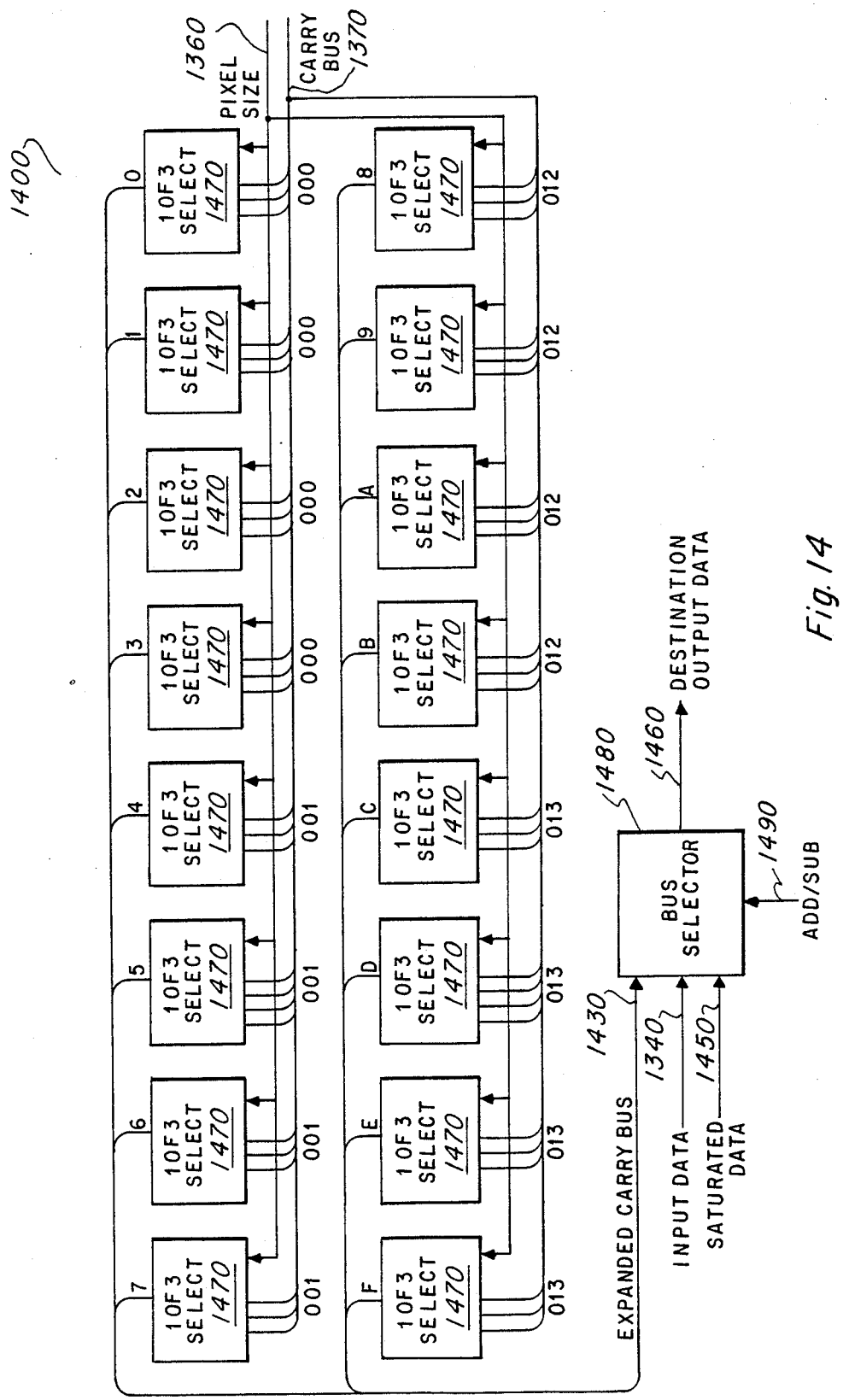
FIG. 14 illustrates the construction of the arithmetic logic unit for performing addition and subtraction with saturation in accordance with the preferred embodiment of the present invention.
Figure 15:
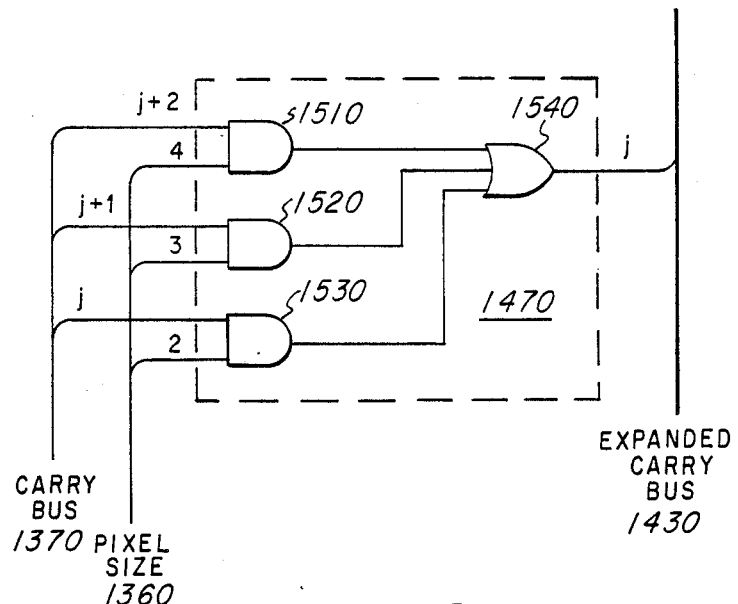
FIG. 15 illustrates the construction of the one of three select circuits shown in FIG. 14.
Figure 16:
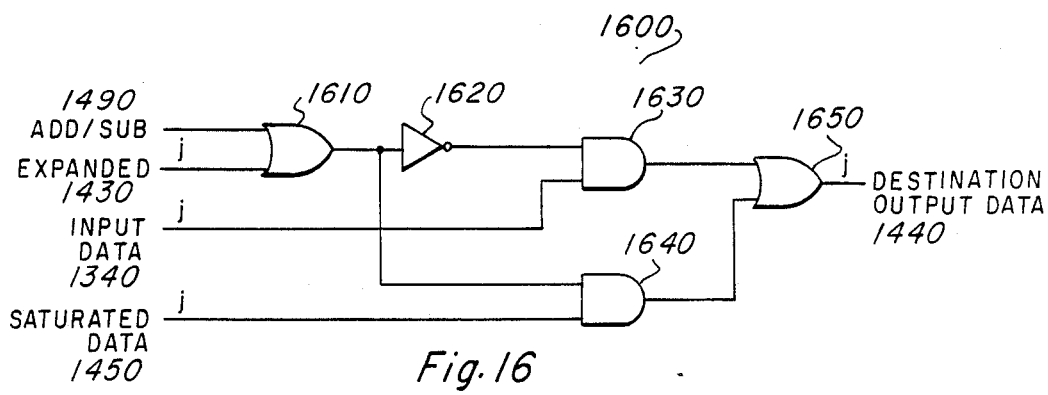
FIG. 16 illustrates the construction of a representative bit of the bus selector circuit shown in FIG. 14.

The manner of operation of the structure of the preferred embodiment of the present invention will be explained in conjunction with FIGS. 13 to 16. FIG. 13 illustrates the hardware of the arithmetic logic unit which performs the source destination combination specified by the pixel processing bits. FIG. 14 illustrates the structure of the saturate substitution apparatus which serves to detect a saturated operation and to substitute the saturated value for the actual resultant data in the case the saturated operation is detected. FIGS. 15 and 16 illustrate details of portions of the structure illustrated in FIG. 14.

FIG. 13 illustrates arithmetic logic unit 1300 which performs the arithmetic and logic combinations of the source and destination pixels to generate the resultant destination pixel. Arithmetic logic unit 1300 receives as an input the source data on source bus 1310 and the destination data on destination bus 1320. In conjunction with a control input on control bus 1330, a plurality of arithmetic logic subunits 1352, 1354, 1356 and 1358 generate a resultant on output data bus 1340. The signals on control bus 1330 causes each of the arithmetic logic subunits 1352, 1354, 1356 and 1358 to perform the operation selected by the pixel processing bits within control register 910. The combinations of logic and arithmetic operations specified by the pixel processing bits are shown above in conjunction with table 1.

In accordance with the preferred embodiment, both the source and destination comprise 16 bits corresponding to a single word from memory 132. Rather than providing a single 16 bit arithmetic logic unit for combination of the source and destination data, arithmetic logic unit 1300 includes 4 separate arithmetic logic subunits 1352, 1354, 1356 and 1358. Each of these arithmetic logic subunits operates on a 4 bit portion of the source and destination data. Arithmetic logic subunit 1352 operates on bits 12 to 15. Arithmetic logic subunit 1354 operates on bits 8 to 11. Arithmetic logic subunit 1356 operates on bits 4 to 7. Lastly, arithmetic logic subunit 1358 operates on bits 0 to 3. This division of the 16 bits into four 4 bit parts is provided in order to enable interruption and control of the propagation of the carry bits between 4 bit segments. The carry output of arithmetic logic subunit 1354 on line 1372 is applied to one input of AND gate 1384. The output of AND gate 1384 is applied to the carry input of the next higher arithmetic logic subunit 1352. In like manner the carry output of arithmetic logic subunit 1356 on line 1373 is applied to AND gate 1386. The output of AND gate 1386 is applied to the carry input of arithmetic logic subunit 1354, which corresponds to the next most significant bits. Lastly, the carry output of arithmetic logic subunit 1358 on line 1374 is applied to one input of AND gate 1388. The output of AND gate 1388 is applied to the carry input of arithmetic logic subunit 1356 which operates on the next most significant bits.

The AND gates 1388, 1386 and 1384 are controlled from decoder 1380 via lines 1381 and 1382. The second inputs of AND gates 1384 and 1388 are connected to control line 1381. The second input of AND gate 1386 is connected to control line 1382. Decoder 1380 is responsive to pixel size data on pixel size bus 1360. A summary of the outputs of decoder 1380 is shown in Table 2. Note that because no arithmetic pixel processing operations can be performed on pixels having a length of one or two bits, the state of decoder 1380 is undefined for those cases.

TABLE 2

| Pixel Size (Bits) | 1381 Output | 1382 Output |
|---|---|---|
| 4 | 0 | 0 |
| 8 | 1 | 0 |
| 16 | 1 | 1 |

If the pixel size is 16, then a "1" is generated on both control lines 1381 and 1382. This serves to connect a carry path from arithmetic logic subunit 1358 to arithmetic logic subunit 1356, from arithmetic logic subunit 1356 to arithmetic logic subunit 1354 and from arithmetic logic subunit 1354 to arithmetic logic subunit 1352. This output in effect causes the 4 arithmetic logic subunits to become a single 16 bit arithmetic logic unit. This is in accordance with the case illustrated at 560 of FIG. 5.

If, on the other hand, a pixel size of 8 is received from pixel size bus 1360, then a "1" is generated on control line 1381 and "0" is generated on control line 1382. This serves to connect a carry path from arithmetic logic subunit 1358 to arithmetic logic subunit 1356 and from arithmetic logic subunit 1354 to arithmetic logic subunit 1352, but breaks the carry path between arithmetic logic subunit 1356 and arithmetic logic subunit 1354. This causes the 4 arithmetic logic subunits to become a pair of 8 bit arithmetic logic units, the first on the most significant bits 8 to 15 including arithmetic logic subunits 1352 and 1354, and the other on the least significant bits 0 to 7 formed of arithmetic logic subunits 1356 and 1358. In this case, the 16 bit word on both the source bus 1310 and the destination bus 1320 includes a pair of 8 bit pixels, in accordance with that illustrated at 550 in FIG. 5. The disabling of AND gate 1386, thus prevents any carry output from arithmetic logic subunit 1356 from affecting the independent pixel being operated on in arithmetic logic subunits 1352 and 1354.

Lastly, if the pixel size received on pixel size bus 1360 is 4, then decoder 1380 generates a "0" output on both control lines 1381 and 1382. This serves to disable each of the AND gates 1384, 1386 and 1388. Thus the 4 arithmetic logic subunits are divided into 4 independent sections such as illustrated at 540 in FIG. 5. Thus arithmetic logic unit 1300 operates on 4 independent 4 bit pixels simultaneously.

Carry bus encoder 1375 generates a carry bus output 1370. Carry bus encoder 1375 is responsive to the pixel size data on pixel size bus 1360. Carry bus encoder 1375 is also responsive to the carry output of each of the 4 arithmetic logic subunits. Carry output 1371 comes from arithmetic logic subunits 1352. Carry output 1372 comes from arithmetic logic subunit 1354. Carry output 1373 comes from arithmetic logic subunit 1356. Lastly, carry output 1374 comes from arithmetic logic subunit 1358. Carry bus encoder 1375 generates a bus signal of 4 bits on carry bus 1370 in accordance with both the pixel size data and the various carry outputs. A state table illustrating the operation of carry bus encoder 1375 is given at Table 3.

TABLE 3

| Pixel Size (Bits) | Output Bit 0 | Output Bit 1 | Output Bit 2 | Output Bit 3 |
|---|---|---|---|---|
| 4 | 1374 0 | 1373 1 | 1372 2 | 1371 3 |
| 8 | 1373 1 | 1373 1 | 1371 3 | 1371 3 |
| 16 | 1371 3 | 1371 3 | 1371 3 | 1371 3 |

Carry bus encoder 1375 serves to eliminate consideration of carry output data that is not relevant to the saturation operations. For example, if the pixel size is 16 then the intermediate carry operations on carry output lines 1372, 1373, and 1374 are unimportant. This is because, in a 16 bit pixel these carry operations occur within the pixel and are not relevant to the decision on whether saturation is required. Similarly, if 8 bits per pixel are selected then the carry outputs 1372 and 1374 are meaningless, this is because these carry outputs occur within the data word of the pixel and are not relevant to the decision on saturation.

In accordance with the preferred embodiment, arithmetic logic unit 1300 performs the arithmetic operations on pixels of 4, 8 and 16 bits only. The operations of addition, addition with saturation, subtraction, substraction with saturation, minimum and maximum which are listed in the pixel processing options illustrated in table 1 can be defined for pixels of 2 bits. Therefore, it is feasible to provide arithmetic logic unit 1300 with additional carry interruptions to enable performance of these arithmetic functions on pixels of 2 bits. In accordance with the preferred embodiment however, such addition carry control circuits are not employed. This is because the addition of those carry control circuits needed for operation on 2 bits per pixel is relatively great when compared with the circuitry necessary for data of 4 bits per pixel. Note in FIG. 13 that there are 3 AND gates for carry control and 4 carry outputs to be considered. However, in order to properly provide the control for 2 bits per pixel, 7 AND gates and 8 carry output lines are necessary. In the interest of reducing the amount of circuitry within arithmetic logic unit 1300 the preferred embodiment of the present invention limits those arithmetic operations to 4 or more bits per pixel. Note that the output of arithmetic logic subunits 1352, 1354, 1356 and 1358 are assembled together into output data bus 1340.

FIG. 14 illustrates saturation circuit 1400 which performs the saturation function. Saturation circuit 1400 is a part of special graphics hardware 210 within the graphics processor. Saturation circuit 1400, like other portions of special graphic hardware 210, is under the control of central processing unit 200. Saturation circuit 1400 receives inputs from pixel size bus 1360, carry bus 1370, input data bus 1340, saturated data bus 1450 and addition/subtract signal 1490. Saturation circuit 1400 generates destination output data on bus 1460. Saturation circuit 1400 includes 16 one of three select circuits 1470 which receive data from the pixel size bus 1360 and carry bus 1370 and generates an expanded carry output on an expanded carry bus 1430. Saturation circuit 1400 further includes bus selector 1480 which receives the expanded carry bus 1430, the input data bus 1340, the saturated data bus 1450 and addition/subtract signal 1490 and generates the destination output data output on bus 1460.

The signal applied to expanded carry bus 1430 is assembled bit by bit by 16 one of three select circuits 1470. Each of these 16 one of three select circuits 1470 has the three most significant bits of the five least significant bits of the pixel size bus 1360 applied thereto. Note that although input/output register 940 contains 16 bits in accordance with the preferred embodiments, only the five least significant bits are necessary to specify the pixel size with a signal bit set to "1". This is because the maximum pixel size in the preferred embodiment is 16 bits per pixel. Also, since the add with saturate and the subtract with saturate pixel processing options are defined for only pixels of 4, 8 or 16 bits, only the three most significant bits of the pixel size bus 1360 are required to specify thereamong. In addition, each one of three select circuit 1470 has three of the four bits of carry bus 1370 applied thereto.

A study of FIG. 14 indicates the bit numbers of the bits applied to each of the one of three circuits 1470. Referring briefly to FIG. 15, a detailed diagram of one of the one of three select circuits 1470 is illustrated. Each one of three select circuits 1470 includes three AND gates 1510, 1520 and 1530. Each of the AND circuits has a single bit from the pixel size bus 1360 applied thereto. In addition, each of these AND circuits has one bit from the carry bus 1370 applied thereto. These are designated j, j+1 and j+2. Reference must be made to the numbers appearing in FIG. 14 to indicate which bits from carry bus 1370 are applied to each of the one of three select circuits 1470. The output of the three AND circuits 1510, 1520 and 1530 are applied to separate inputs of a single OR circuit 1540. This output becomes one of the bits of expanded carry bus 1430.

The operation of one of three select circuits 1470 will now be explained. One of three select circuit 1470 enables application of one of the three bits from carry bits 1370 to the expanded carry bus 1430. In accordance with the preferred embodiment, the only number of bits per pixel permitted for addition with saturation and subtraction with saturation are 4, 8 and 16. The pixel size is expressed as a 5 bit digital number corresponding to the selected number of bits. These bits are designated 0 to 4. Addition with saturation and subtraction with saturation pixel processing operations are not defined for 1 to 2 bits per pixel, therefore, only the three most significant bits (2, 3 and 4) of the five least significant bit of pixel size bus 1360 are required to be applied to one of three select 1470. Since the pixel size data corresponds to the number of bits per pixel, only one of the bits two through four of the pixel size bus 1360 contain a "1" no matter which allowable pixel size is selected. All other bits are "0". Therefore, only one of the AND gates 1510, 1520 or 1530 is enabled, thereby permitting the selected bit from carry bus 1370 to be applied to OR gate 1540. Thus, OR gate 1540 receives zeros from all the nonselected AND gates and either a "0" or a "1" from the selected AND gate. This data is applied to the corresponding bit of the expanded carry bus 1430.

Referring back to FIG. 14, suppose for example that the number of bits per pixel selected was 16. Thus, each one of three select circuit 1470 selects the first of the bit numbers illustrated in FIG. 14. Thus, each of the 0 through F bits of expanded carry bus 1430 are selected from the 0 bit of the carry bus. If the number of bits per pixel is selected as eight, then each one of three select circuit 1470 selects the second bit of the carry bus 1370 applied thereto. Thus, bits 0 through 7 of expanded carry bus 1430 receive data from the 0 bit of the carry bus 1370 and bits 8 through F of the expanded carry bus 1430 receive data from the 1 bit of carry bus 1370. Similarly, if the pixel size is four, bits 0 to 3 receive data from the 0 bit of the carry bus 1370, bits 4 to 7 receive data from the 1 bit of carry bus 1370. Bits 8 to B receive data from the 2 bit of carry bus 1370 and bits C to F receive data from the 3 bit of carry bus 1370. Thus, dependent upon the pixel size data 1, 2 or 4 bits of carry bus 1370 are selected to form expanded carry bus 1430.

Bus selector 1480 enables selection of data from either input data 1340 or saturated data 1450 based upon the state of the corresponding bit of expanded carry bus 1430 and of addition/subtraction control 1490. An example of the j-th bit of bus selector 1480 is illustrated in FIG. 16. The j-th bit of the expanded carry bus is applied to exclusive OR gate 1610 together with the addition/subtraction control 1490. If addition/subtraction control 1490 indicates addition, then the j-th bit of the expanded carry bus 1430 is unaltered. On the other hand if the addition/subtraction control indicates subtraction, then the j-th bit of the expanded carry bus 1430 is inverted. This serves to reverse the substitution performed in bus selector 1480 dependent upon whether addition or substraction is selected. Note from the prior discussion the existence is selected. Note from the prior discussion the existence of a carry indicates saturation during addition while the absence of a carry indicates saturation during subtraction. Thus exclusive OR gate 1610 selectively inverts the output of expanded carry bus 1430.

The output of exclusive OR gate 1610 is applied to inverter 1620 and one input of AND gate 1640. The output of inverter 1620 is applied to one input of another AND gate 1630. This arrangement insures that the signal on the j-th bit of the expanded carry bus enables one of the AND gates 1630 or 1640. The j-th bit of the input data 1340 is applied to the other input of AND gate 1630. Similarly, the j-th bit of the saturated data is applied to the other input of AND gate 1640. The outputs of the two AND gates 1630 and 1640 are applied to separate inputs of OR gate 1650. Dependent upon the state of the j-th bit of the expanded carry bus, the output of OR gate 1650 corresponds either to the j-th bit of the input data or the j-th bit of the saturated data. Thus, the j-th bit of the destination output data corresponds to the j-th bit of the input data 1340 or the j-th bit of the saturated data 1450 dependent upon the state of the j-th bit of the expanded carry bus.

Note that the saturated data 1450 differs dependent upon the selected operation. If addition with saturation is selected then the saturated data is all "1's". If subtraction is selected then the saturated data is all "0's". The expanded carry bus 1430 serves to control the application of either the actual resultant data from the arithmetic logic unit 1300 or the saturated data for each pixel by providing a signal for each bit based upon the relevant carry output. Thus the destination output data 1460 to be stored into destination location within the video memory 132 is either the resultant or the saturated value.

Although the present invention has been described in conjunction with 16 bit data words, those skilled in the art understand that this limitation is merely a matter of convenience. Other larger or smaller number of bits per data word is possible utilizing the principles of the present invention. As noted above the present invention has been described in conjunction with the preferred embodiment in which only pixel sizes of 4, 8 and 16 are permitted. The elimination of arithmetic pixel processing for the pixel size of two bits is a mere design convenience and not required by the present invention. Those skilled in the art would recognize that the principles of the present invention could equally well be employed for two bit pixels.

We claim:

1. A graphics data processing apparatus comprising:
    a first image memory for storing a first array of pixels, each pixel represented by an N bit color code;
    a second image memory for storing a second array of pixels, each pixel represented by an N bit color code; and
    an array image operator connected to said first and second image memories for performing a nonlinear saturating combination on corresponding pixels from said first and second arrays of pixels to produce a third array of N bit color code pixels from said first and second arrays that have no more than a certain maximum value and no less than a certain minimum value.

2. A graphics data processing apparatus as claimed in claim 1, further comprising:
    a visual display connected to said second image memory for generating a visually perceivable representation of said second array of pixels, each pixel having a color corresponding to said representative N bit color code.

3. A graphics image processing apparatus as claimed in claim 1, wherein:
    said array image operator further stores said third array of pixels in said second image memory, each pixel of said third array of pixels replacing the corresponding pixel of said second array of pixels.

4. A graphics data processing apparatus as claimed in claim 1, wherein:

said nonlinear saturating combination of said array image operator includes addition of said first and second N bit color codes of corresponding pixels with saturation at $2^N-1$, said array image operator producing an N bit color code for each pixel within said third array of pixels which is the sum of the N bit color codes of corresponding pixels from said first and second arrays, said N bit color code of each pixel of said third array of pixels having a maximum value of $2^N-1$ when the sum of said corresponding N bit color codes of said first and second arrays equal or exceed $2^N-1$, thereby providing an N bit color code of all "1's" upon saturation.

5. A graphics data processing apparatus as claimed in claim 1, wherein:

said nonlinear saturating combination of said array image operator includes subtraction of said second N bit color code from said first N bit color code of corresponding pixels with saturation at 0, said image array operator producing an N bit color code for each pixel within said third array of pixels which is the difference of the N bit color code of the corresponding pixel from said first array and the N bit color code of the corresponding pixel of said second array, said N bit color code of each pixel of said third array of pixels having a minimum value of 0 when the difference of said N bit color code of said first array and the said N bit color code of said second array is equal to or less than 0, thereby providing an N bit color code of all "0's" upon saturation.

6. A graphics data processing apparatus as claimed in claim 1, wherein said array image operator includes:

an arithmetic logic unit having a first input connected to said first image memory, having a second input connected to said second image memory, and having a data output and a carry output, said data output presenting the result of a selected arithmetic combination of the data received at said first and second inputs, and said carry output presenting the carry result of said combination;

carry expand means, having an input connected to the carry output of said arithmetic logic unit and having an expand output, for expanding said carry result to correspond to a plurality of bits; and a bus selector, having a first input connected to the data output of said arithmetic logic unit, having a second input for receiving saturate data, having a third input connected to said expand output of said carry expand means, and having an output for presenting a plurality of bits corresponding to a pixel of said third array, said bus selector selecting, for each of its output bits, either a bit of said data output or a bit of said said saturate data, responsive to the carry result on a corresponding bit of said expand output.

7. A graphics data processing apparatus as claimed in claim 6, wherein said said arithmetic logic unit includes:

a plurality of arithmetic logic subunits, each of which performs said selected combination on a subset of the data received at said first and second inputs, said arithmetic logic subunits having their carry inputs and outputs connected together in a carry chain from least significant to most significant; and a pixel size decoder, having an input for receiving pixel size data, and having an output connected to said arithmetic logic subunits, for breaking the carry chain between selected arithmetic logic subunits responsive to the pixel size data received at its input.

8. A graphics data processing apparatus as claimed in claim 7, wherein said arithmetic logic unit further includes:

a carry output encoder, having a first input for receiving said pixel size data, having a second input for receiving the carry outputs of said arithmetic logic subunits, and having an output for presenting said carry output of said arithmetic logic unit in an encoded fashion responsive to said pixel size data; and wherein said carry expand means comprises:

a plurality of carry data selectors, each having a first input for receiving pixel size data, having a second input for receiving said carry output of said arithmetic logic unit, and having an output for presenting a selected bit of said encoded carry output, responsive to said pixel size data.

9. A graphics data processing apparatus comprising:

an image memory having a first image portion for storing a first array of pixels, each pixel represented by an N bit color code and a second image portion for storing a second array of pixels, each pixel represented by an N bit color code; and an array image operator connected to said image memory for performing a nonlinear saturating combination on corresponding pixels from said first and second arrays of pixels to produce a third array of N bit color code pixels from said first and second arrays that have no more than a certain maximum value and no less than a certain minimum value.

10. A graphics data processing apparatus as claimed in claim 9, further comprising:

a visual display connected to said image memory for generating a visually perceivable representation of said second array of pixels, each pixel having a color corresponding to said representative N bit color code.

11. A graphics image processing apparatus as claimed in claim 9, wherein:

said array image operator further stores said third array of pixels in said second image portion of said image memory, each pixel of said third array of pixels replacing the corresponding pixel to said second array of pixels.

12. A graphics image processing apparatus as claimed in claim 9, further comprising:

a source indicating means for indicating the locations within said image memory where said first array of pixels is stored; and a destination indicating means for indicating the location within said image memory where said second array of pixels is stored.

13. A graphics image processing apparatus as claimed in claim 12, wherein:

said source indicating means includes a source address register having stored therein the address of a predetermined portion of said first array, and a size register having stored therein an indication of the size of said first array in both horizontal and vertical directions; and said destination indicating means includes a destination address register having stored therein the address of said second array, said second array having the same horizontal and vertical dimensions as said first array.

14. A graphics image processing apparatus as claimed in claim 13, wherein:
   said size register includes an width section storing data indicative of the width of said first array and a height section storing data indicative of the height of said first array.

15. A graphics data processing apparatus as claimed in claim 9, wherein:
   said nonlinear saturating combination of said array image operator includes addition of said first and second N bit color codes of corresponding pixels with saturation at $2^N-1$, said array image operator producing an N bit color code for each pixel within said third array of pixels which is the sum of the N bit color codes of corresponding pixels from said first and second arrays, said N bit color code of each pixel of said third array of pixels having a maximum value of $2^N-1$ when the sum of said corresponding N bit color codes of said first and second arrays equal or exceed $2^N-1$, thereby providing an N bit color code of all "1's" upon saturation.

16. A graphics data processing apparatus as claimed in claim 9, wherein:
   said nonlinear saturating combination of said array image operator includes subtraction of said second N bit color code from said first N bit color code of corresponding pixels with saturation at 0, said image array operator producing an N bit color code for each pixel within said third array of pixels which is the difference of the N bit color code of the corresponding pixel from said first array and the N bit color code of the corresponding pixel of said second array, said N bit color code of each pixel of said third array of pixels having a minimum value of 0 when the difference of said N bit color code of said first array and N bit color code of said second array is equal to or less than 0, thereby providing an N bit color code of all "0's" upon saturation.

17. A graphics data processing apparatus as claimed in claim 9, wherein said array image operator includes:
   an arithmetic logic unit having a first input connected to said first image memory, having a second input connected to said second image memory, and having a data output and a carry output, said data output presenting the result of a selected arithmetic combination of the data received at said first and second inputs, and said carry output presenting the carry result of said combination;
   carry expand means, having an input connected to the carry output of said arithmetic logic unit and having an expand output, for expanding said carry result to correspond to a plurality of bits; and
   a bus selector, having a first input connected to the data output of said arithmetic logic unit, having a second input for receiving saturate data, having a third input connected to said expand output of said carry expand means, and having an output for presenting a plurality of bits corresponding to a pixel of said third array, said bus selector selecting, for each of its output bits, either a bit of said data output or a bit of said said saturate data, responsive to the carry result on a corresponding bit of said expand output.

18. A graphics data processing apparatus as claimed in claim 17, wherein said said arithmetic logic unit includes:
   a plurality of arithmetic logic subunits, each of which performs said selected combination on a subset of the data received at said first and second inputs, said arithmetic logic subunits having their carry inputs and outputs connected together in a carry chain from least significant to most significant; and
   a pixel size decoder, having an input for receiving pixel size data, and having an output connected to said arithmetic logic subunits, for breaking the carry chain between selected arithmetic logic subunits responsive to the pixel size data received at its input.

19. A graphics data processing apparatus as claimed in claim 18, wherein said arithmetic logic unit further includes:
   a carry output encoder, having a first input for receiving said pixel size data, having a second input for receiving the carry outputs of said arithmetic logic subunits, and having an output for presenting said carry output of said arithmetic logic unit in an encoded fashion responsive to said pixel size data;
   and wherein said carry expand means comprises:
   a plurality of carry data selectors, each having a first input for receiving pixel size data, having a second input for receiving said carry output of said arithmetic logic unit, and having an output for presenting a selected bit of said encoded carry output, responsive to said pixel size data.

20. A graphics data processing apparatus comprising:
   a memory interface for transmission of address, data and read/write control signals;
   a source address register memory having stored therein a source memory address of a predetermined portion of a first selected image;
   a destination address register memory having stored therein a destination memory address of a predetermined portion of a second selected image; and
   an array image operator connected to said memory interface, said source address register memory, said array size register and said destination address register memory, said array image operator including:
   (a) a source address circuit applying the address stored in said source address register memory and a memory read signal to said memory interface to recall the source pixel data word stored at said memory address stored in said source address register memory,
   (b) a destination address circuit applying the address stored in said destination address register memory and a memory read signal to said memory interface to recall the destination pixel data word stored at said memory address stored in said destination address register memory,
   (c) a combination circuit generating a combined pixel data word by combining said source pixel data word and said destination pixel data word, each combined pixel data word being a nonlinear saturating combination of said corresponding source and destination pixel data words that has no more than a certain maximum value and no less than a certain minimum value,
   (d) said destination address circuit applying the address stored in said destination address register memory, said combined pixel data word and said memory write signal to said memory interface to store said combined pixel data word in said memory address that is stored in said destination address register memory, (e) a source incrementing circuit updating the address stored in said source address register to refer to the next whole data word of said source array, (f) a destination incrementing circuit updating the address stored in said destination address register to refer to the next whole data word of said destination array, and (g) said source and destination incrementing circuits incrementing their respective addresses successively until the entire first selected image is recalled, combined with said second selected image and stored in said second selected image.

21. A graphics data processing apparatus as claimed in claim 20, further including:

an array size register memory connected to said array image operator and including a width section storing data indicative of the width of said selected image and a height section storing data indicative of the height of said selected image; and said array image operator including an update circuit that updates the address stored in said source address register and said destination address register in accordance with said width and height indicated by said array size register.

22. A graphics data processing apparatus as claimed in claim 20, wherein:

said nonlinear saturating combination of said array image operator combination circuit includes addition of said first and second N bit color codes of corresponding pixels with saturation at $2^N-1$ to produce an N bit color code for each pixel within said third array of pixels which is the sum of the N bit color codes of corresponding pixels from said first and second arrays, said N bit color code of each pixel of said third array of pixels having a maximum value of $2N-1$ when the sum of said corresponding N bit color codes of said first and second arrays equal or exceed $2^N-1$, thereby providing an N bit color code of all "1's" upon saturation.

23. A graphics data processing apparatus as claimed in claim 20, wherein:

said nonlinear saturating combination of said array image operator combination circuit includes subtraction of said second N bit color code from said first N bit color code of corresponding pixels with saturation at 0 to produce an N bit color code for each pixel within said third array of pixels which is the difference of the N bit color code of the corresponding pixel from said first array and the N bit color code of the corresponding pixel of said second array, said N bit color code of each pixel of said third array of pixels having a minimum value of 0 when the difference of said N bit color code of said first array and said N bit color code of said second array is equal to or less than 0, thereby providing an N bit color code of all "0's" upon saturation.

* * * * *